(12) United States Patent
Du et al.

(10) Patent No.: US 12,615,108 B2
(45) Date of Patent: Apr. 28, 2026

(54) INFORMATION PROCESSING METHOD AND DEVICE

(71) Applicant: GUANGDONG OPPO MOBILE TELECOMMUNICATIONS CORP., LTD., Dongguan (CN)

(72) Inventors: Zhongda Du, Dongguan (CN); Zuomin Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 597 days.

(21) Appl. No.: 18/090,068

(22) Filed: Dec. 28, 2022

(65) Prior Publication Data

US 2023/0224088 A1 Jul. 13, 2023

Related U.S. Application Data

(63) Continuation of application No. PCT/CN2020/129454, filed on Nov. 17, 2020.

(51) Int. Cl.
| | |
|---|---|
| *H04W 72/02* | (2009.01) |
| *H04L 1/1812* | (2023.01) |
| *H04W 72/21* | (2023.01) |
| *H04W 72/23* | (2023.01) |

(52) U.S. Cl.
CPC ........... *H04L 1/1812* (2013.01); *H04W 72/21* (2023.01); *H04W 72/23* (2023.01)

(58) Field of Classification Search
CPC ... H04L 5/0053; H04L 5/0055; H04L 5/0057; H04W 72/02; H04W 72/04; H04W 72/0446; H04W 72/121; H04W 72/23; H04W 72/50; H04W 72/51; H04W 72/52; H04W 72/53; H04W 72/54;
(Continued)

(56) References Cited

U.S. PATENT DOCUMENTS

| | | | |
|---|---|---|---|
| 2020/0313805 A1 | 10/2020 | Park | |
| 2023/0163887 A1* | 5/2023 | Cheng | ................... H04W 72/23 370/329 |
| 2023/0318757 A1* | 10/2023 | Lee | ....................... H04L 1/1896 370/329 |

FOREIGN PATENT DOCUMENTS

| | | |
|---|---|---|
| CN | 103546254 A | 1/2014 |
| CN | 106717091 A | 5/2017 |
| CN | 110891314 A | 3/2020 |
(Continued)

OTHER PUBLICATIONS

International Search Report and Written Opinion with English Translation for PCT Application PCT/CN2020/129454 mailed Aug. 23, 2021. (17 pages).
(Continued)

*Primary Examiner* — Bo Hui A Zhu
(74) *Attorney, Agent, or Firm* — Young Basile Hanlon & MacFarlane, P.C.

(57) ABSTRACT

An information processing method is disclosed. The method includes: generating, by a transmitting terminal, an indication information, wherein the indication information is configured to indicate data transmission on at least one hybrid automatic retransmission request (HARQ) process, and the data transmission at least comprises successful data transmission or data transmission failure; sending, by the transmitting terminal, the indication information to a network device.

20 Claims, 5 Drawing Sheets

101

102                                    103

(58) Field of Classification Search
CPC ............. H04W 72/541; H04W 72/542; H04W
72/543; H04W 72/56
See application file for complete search history.

(56)                    References Cited

FOREIGN PATENT DOCUMENTS

CN          111757294  A     10/2020
WO        2020210333  A1    10/2020

OTHER PUBLICATIONS

Extended European Search Report for EP Application 20961834.7
mailed Dec. 4, 2023. (7 pages).

* cited by examiner

INFORMATION PROCESSING METHOD AND DEVICE

CROSS-REFERENCE TO RELATED APPLICATION(S)

The present disclosure is a continuation application of International Patent Application No. PCT/CN2020/129454, filed on Nov. 17, 2020, the entire contents of which are incorporated herein by reference in its entirety.

TECHNICAL FIELD

The present disclosure relates to the technology field of Internet of Things (IoT), in particular to an information processing method, an information processing device, and a computer storage medium.

BACKGROUND

As a key technology for 5th generation mobile networks (5G), device-to-device (D2D) communication is attracting attention for its ability to provide new services, improve system throughput, and enhance user experience. D2D communication technology is a communication method in which two or more peer-to-peer user equipments communicate directly with each other. In a distributed network including D2D communication users, each user equipment is able to send and receive signals and has the function of automatic routing (forwarding messages).

To support direct communication between user equipments, a sidelink is introduced. Currently, user equipments on the sidelink can transmit data using scheduling-free grant radio resources. If resources are not available, user equipments can request resource reconfiguration from the network, and network devices can configure a new radio resource for the user equipments to perform retransmission based on a relationship between radio resources and Hybrid Automatic Repeat reQuest (HARQ) processes.

SUMMARY

In a first aspect, some embodiments in the present disclosure provide an information processing method, including: generating, by a transmitting terminal, an indication information. wherein the indication information is configured to indicate data transmission on at least one hybrid automatic retransmission request (HARQ) process, and the data transmission at least comprises successful data transmission or data transmission failure; sending, by the transmitting terminal, the indication information to a network device.

In a second aspect, some embodiments in the present disclosure provide an information processing method, including:
receiving, by a network device, an indication information from a transmitting terminal, wherein the indication information is configured to indicate data transmission on at least one hybrid automatic retransmission request (HARQ) process, and the data transmission at least comprises successful data transmission or data transmission failure.
determining, by the network device, whether to send resource configuration information based on the indication information, wherein the resource configuration information is configured to indicate resource information for data retransmission by the transmitting terminal.

In a third aspect, some embodiments in the present disclosure provide an information processing device including a memory and a processor, wherein the memory is configured to store a computer program, and the processor is configured to call and run the computer program in the memory, causing the information processing device to execute any one method in the first aspect.

In a fourth aspect, some embodiments in the present disclosure provide an information processing device including a memory and a processor, wherein the memory is configured to store a computer program. and the processor is configured to call and run the computer program in the memory. causing the information processing device to execute any one method in the second aspect.

DETAILED DESCRIPTION

In order to describe the purpose, technical solutions and advantages in the embodiments of the disclosure clearly, the technical solutions in embodiments of the present disclosure will be clearly and completely described below in conjunction with the accompanying drawings in the embodiments of the present disclosure, and it is obvious that the described embodiments are only a part of the embodiments of the present disclosure, but not all of them. Based on the embodiments in the present disclosure, all other embodiments obtained by those skilled in the art without creative labor fall within the scope of the present disclosure.

The terms "include" and "have", and any variations thereof in the embodiments of specification. claims and the figures mentioned above are intended to cover non-exclusive inclusion. For example, a process, method, system, product, or apparatus including a series of steps or units is not limited to the listed steps or units, but optionally further includes steps or units not listed, or optionally further includes other steps or units inherent to the process, method, product, or apparatus.

Figure 1:
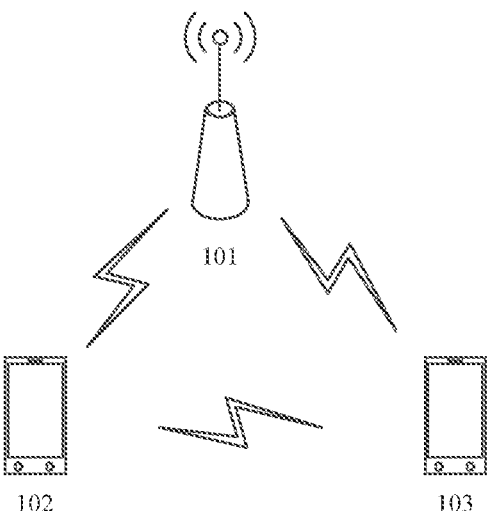
FIG. 1 is a structural schematic view of a communication system applied in some embodiments of the present disclosure.

Before introducing the technical solutions provided in some embodiments of the present disclosure, the communication system applied in the embodiments of the present disclosure is first described. FIG. 1 is a structural schematic view of a communication system applied in some embodiments of the present disclosure. As shown in FIG. 1, the communication system 100 includes a network device 101 and a plurality of terminal devices, such as terminal devices 102 and 103 in FIG. 1. Among them, the network device 101 is communicatively connected to the terminal devices 102 and 103. respectively, and the terminal device 102 is communicatively connected to the terminal device 103. Exemplarily, terminal device 102 may send communication messages to terminal device 103 through network device 101. and terminal device 102 may also send communication messages directly to terminal device 103. The link for direct communication between terminal device 102 and terminal device 103 is called a D2D link, which may also be referred to as a proximity service (ProSe) link or sidelink, etc. D2D links can provide new services, increase system throughput, and provide a better user experience, facilitating interoperability between critical public safety networks and pervasive commercial networks.

In D2D technology, there are two main operational phases: the first is a discovery phase, where for example terminal device 102 may attempt to discover neighboring terminal device 102, which may be performed by terminal device 102 or network device 101; the second is a communication phase, where for example the terminal device 102 communicates directly with the terminal device 103 without data transmission through the network device 101.

For D2D communication, there are two modes of resource allocation: mode 1 and mode 2. In mode 1, network device 101 schedules D2D terminal devices 102 with the resources to be used to send data and control information directly between D2D devices. In mode 1, network device 101 uses a physical downlink control channel (PDCCH) or enhanced PDCCH (EPDCCH) to control the scheduling assignment (SA) and the transmission power of data communication. In mode 2, the terminal device 102 selects its own resources from the resource pool to send data and control information directly to one or more other D2D terminal devices.

The terminal device involved in some embodiment of the present disclosure may also be referred to as a terminal, and may be a device with wireless transceiver capabilities that can be deployed on land, including indoors or outdoors. handheld or vehicle-mounted, on water (e.g., a ship. etc.). and in the air (e.g., on aircraft, balloons, satellites, etc.). The terminal device may be a user equipment (UE), where the UE includes a handheld device, vehicle-mounted device. wearable device, or computing device with wireless communication capabilities. Exemplarily, the UE may be a cell phone. a tablet computer, or a computer with wireless transceiver capabilities. The terminal device can also be a virtual reality (VR) terminal device, augmented reality (AR) terminal device, wireless terminal in industrial control, wireless terminal in unmanned driving, wireless terminal in telemedicine, wireless terminal in smart grid, wireless terminal in smart city. wireless terminal in smart home etc. In some embodiments of the present disclosure, the device for realizing the function of the terminal may be a terminal; it may also be a device capable of supporting the terminal to realize the function, such as a chip system, which may be installed in the terminal. In some embodiments of the present disclosure, the chip system may include a chip, or may include a chip and other discrete devices.

The network device involved in some embodiments of the present disclosure includes a base station (BS), which may be a device deployed in a wireless access network capable of communicating with a terminal wirelessly. The base station may take various forms, such as a macro base station, a micro base station, a relay station, and an access point. Exemplarily. the base station involved in some embodiments of the present disclosure may be a base station in 5th generation mobile networks (5G) or a base station in long term evolution system (LTE), wherein the base station in 5G may also be referred to as a transmission reception point (TRP) or a gNB. In some embodiments of the present disclosure, the device for realizing the function of the network device may be a network device; it may also be a device capable of supporting the network device to realize the function, such as a system on a chip, which may be installed in the network device.

The technical solution in some embodiments of the present disclosure is mainly applied to communication systems based on New Radio (NR) technology, such as 5G communication systems. NR-light systems, etc. It can also be applied to other communication systems, as long as there is an entity in the communication system that needs to instruct to communicate with another entity, and the other entity needs to interpret the data transmission in advance in some way. For example, it can be applied to the scheduling of multiple data blocks between network devices and terminal devices, or two terminal devices, one of which takes the function of accessing the network, etc. Specifically, the communication system may be, for example, a Global System of Mobile communication (GSM) system, a Code Division Multiple Access (CDMA) system, a Wideband Code Division Multiple Access (WCDMA) system, General Packet Radio Service (GPRS), Long Term Evolution (LTE) system, Long Term Evolution Advanced (LTE-A) system, Frequency Division Duplexing (FDD) system, and LTE Time Division Duplex (Time Division Duplex, TDD) system, Universal Mobile Telecommunication System (UMTS), etc.

Wireless communication between communication devices may include: wireless communication between a network device and a terminal device, wireless communication between a network device and a network device, and wireless communication between a terminal device and a terminal device. Among them, in some embodiments of the present disclosure, the term "wireless communication" can also be abbreviated as "communication", and the term "communication" can also be described as "data transmission", "information transmission" or "transmission". The skilled in the art may use the technical solution provided in the present disclosure for wireless communication between network devices and terminal devices, such as wireless communication between access network devices and terminal devices, and wireless communication between core network devices and terminal devices.

Based on the above communication system, currently, a transmitting terminal (TX UE, e.g., terminal device 102 shown in FIG. 1) on a sidelink can transmit data to a receiving terminal (RX UE, e.g., terminal device 103 shown in FIG. 1) using a scheduling-free grant radio resource. The scheduling-free grant radio resource is a periodic radio resource pre-configured by the network for the terminal, and a scheduling-free grant can be configured with 1, 2, or 3 radio resources in a cycle. The scheduling-free grant can be configured by means of high-level Radio Resource Control (RRC) signaling, or by combining RRC signaling with underlying signaling (e.g., physical layer signaling).

Figure 2:
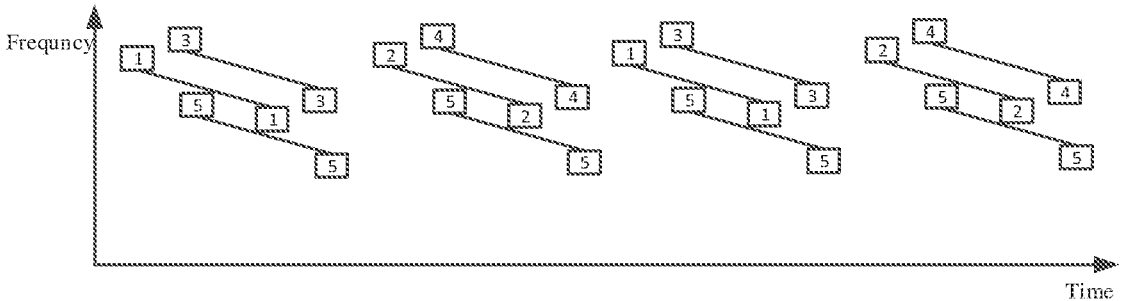
FIG. 2 is a schematic view of a relationship between scheduling-free grant radio resources of the sidelink and numbers of hybrid automatic retransmission request (HARQ) processes.

Exemplarily, FIG. 2 is a schematic view of a relationship between scheduling-free grant radio resources of the sidelink and hybrid automatic retransmission request (HARQ) process numbers. As shown in FIG. 2, the radio resources corresponding to HARQ process numbers 1 and 2 are scheduling-free grant 1, the radio resources corresponding to HARQ process numbers 3 and 4 are scheduling-free grant 2, and the radio resources corresponding to HARQ process numbers 5 and 6 are scheduling-free grant 3. Each scheduling-free grant has two radio resources in each scheduling-free grant cycle, and each radio resource includes a Physical Sidelink Physical Control Channel (PDCCH) and a Physical Sidelink Physical Share Channel (PSSCH). The above HARQ process numbers refer to process numbers on a Uu interface.

Figure 3:
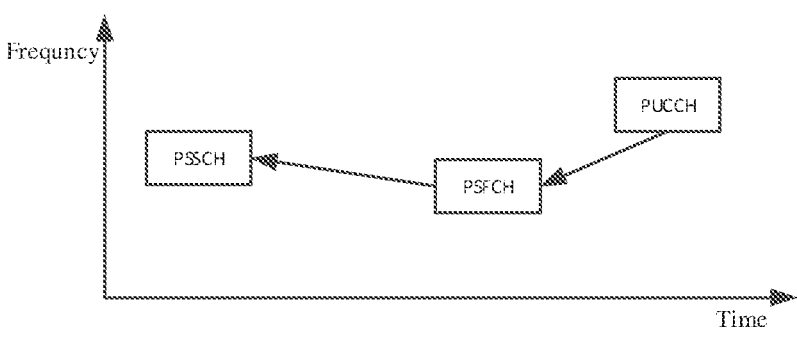
FIG. 3 is a schematic view of the timing relationship among the channel (PSSCH, PSFCH and PUCCH) resources.

The timing relationship between the above Physical Sidelink Feedback Channel (PSFCH) and uplink Physical Uplink Control Channel (PUCCH) is fixed, as shown in FIG. 3. The resources of PSFCH and the resources of PSSCH can be deduced based on the resources of PUCCH. and then the HARQ process number (which is called an identifier alternatively) corresponding to the PSSCH resources can be determined by the network device.

Based on the above description, after receiving the HARQ confirmation message on the PUCCH channel, according to the timing relationship between the channels. the network may determine which specific sidelink for the transmitting terminal to transmits data on the HARQ process, and determine whether the HARQ confirmation message is an ACK (acknowledgment) or a NACK (non-acknowledgment). Subsequently, the network schedules radio resources for retransmission on a HARQ process that receives NACK through the Downlink Control Information (DCI) on the Physical Downlink Control Channel (PDCCH). The DCI includes an identifier on the HARQ process. After receiving the DCI. the transmitting terminal uses reconfigured radio resources by the network for data retransmission on the HARQ process of the original sidelink.

The unlicensed spectrums, such as 2.4 GHz, 5 GHz, 6 GHz or 60 GHz, are supported on the present Uu interface. If the transmitting terminal sends data using unlicensed spectrum of the sidelink, there is no correspondence between radio resources of the unlicensed spectrum and HARQ processes of the sidelink. If the transmitting terminal requires that the network allocates dynamic radio resources for sidelink data retransmission, the network cannot be informed which HARQ process is used by the transmitting terminal, and thus cannot dynamically schedule radio resources for the transmitting terminal.

To address the above problem. some embodiments in the present disclosure provide an information processing method in which the transmitting terminal uses unlicensed spectrum to transmit data on the sidelink. When the data is not sent successfully and the transmitting terminal needs to feed back the HARQ confirmation message corresponding to a certain HARQ process of the sidelink via PUCCH or PUSCH, considering that there is no correspondence between HARQ process of the sidelink and the scheduling-free grant radio resources, the transmitting terminal may use a preset encoding mode on the PUCCH or PUSCH to indicate an identifier of the HARQ process of the sidelink and the HARQ confirmation message corresponding to that identifier, in order to make the network be informed of which HARQ process of the sidelink needs data retransmission. Thus, the network may be informed of the HARQ process of the sidelink, if necessary. and dynamically schedule radio resources for the transmitting terminal for data retransmission.

The technical solutions provided by some embodiments in the present disclosure are described in detail by specific embodiments below. It is noted that the technical solutions provided by the embodiments in the present disclosure may include some or all of the following, and these specific embodiments below may be combined with each other, and the same or similar concepts or processes may not be repeated in some embodiments.

Figure 4:
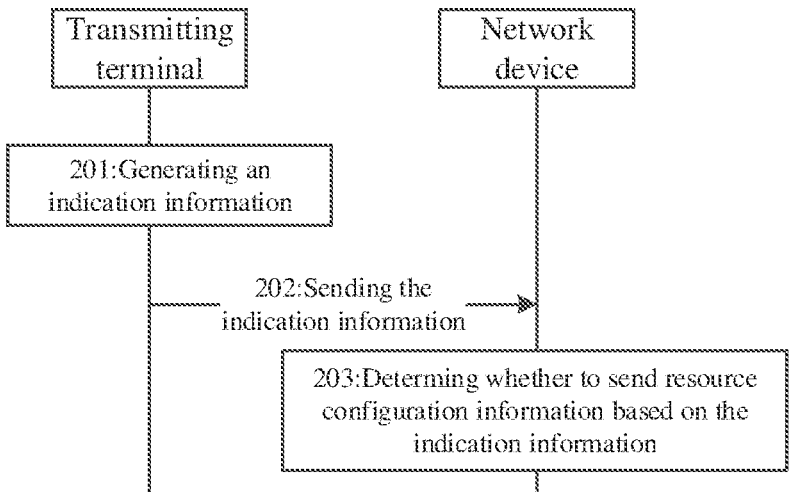
FIG. 4 is an interaction schematic diagram of an information processing method provided in some embodiments of the present disclosure.

FIG. 4 is an interaction schematic diagram of an information processing method provided in some embodiments of the present disclosure. As shown in FIG. 4. the information processing method provided in the embodiment includes actions/operations in the following blocks.

At block 201, a transmitting terminal generates an indication information.

The indication information is configured to indicate data transmission of at least one HARQ process. The data transmission on the HARQ process at least includes successful data transmission or data transmission failure on the HARQ process. Optionally. the data transmission on the HARQ process may also include that no data is transmitted on the HARQ process. i.e., the HARQ process is not used.

In the embodiment, the transmitting terminal transmits data to one or more receiving terminals using unlicensed spectrum of the sidelink. Specifically. the transmitting terminal transmits data to one or more receiving terminals using the unlicensed spectrum on the PSSCH of the sidelink.

As an example, the transmitting terminal transmits a data packet to the receiving terminal on the PSSCH. Optionally. the transmitting device transmits the data packet using the unlicensed spectrum.

As an example, after receiving the data packet transmitted by the transmitting terminal, the receiving terminal sends a response message to the transmitting terminal on the PSFCH of the sidelink. The response message is configured to indicate successful or data transmission failure on the HARQ process N. N is an integer greater than or equal to 0.

In an embodiment of the present disclosure, the transmitting terminal generates the indication information by monitoring a PSFCH of the sidelink.

In an embodiment of the present disclosure, the transmitting terminal determines whether the PSFCH is busy by listening before talk (LBT). If the PSFCH channel is busy, the transmitting terminal generates an indication information to indicate a data transmission failure on the HARQ process. If the transmitting terminal receives a response message from the receiving terminal on the PSFCH channel, the transmitting terminal determines the indication information based on the response message.

In an embodiment of the present disclosure, the transmitting terminal monitors a response message from a receiving terminal on the PSFCH. The response message is configured to indicate data transmission on the HARQ process N. Specifically, the response message indicates successful or data transmission failure on the HARQ process N. The transmitting terminal generates an indication information based on the response message.

If the response message indicates successful data transmission on the HARQ process N. accordingly, the indication information is configured to indicate successful data transmission on the HARQ process N of the network device. If the response message indicates that data transmission failure on the HARQ process N. accordingly. the indication information is configured to indicate that the data transmission failure on the HARQ process N of the network device.

In an embodiment of the present disclosure, the transmitting terminal does not monitor the response message from the receiving terminal on the PSFCH. the transmitting terminal generates an indication information, and the indication information is configured to indicate that data transmission failure on the HARQ process N.

In some embodiments, the transmitting terminal may send data packets to different receiving terminals on different HARQ processes at the same moment, respectively. The transmitting terminal may generate an indication information based on a response message returned by each receiving terminal, and the indication information is configured to indicate data transmission of the plurality of HARQ processes. In the embodiments. the transmitting terminal may indicate the data transmission of multiple HARQ processes at the same time so that the network device may configure new radio resources to multiple HARQ processes at the same time, thereby improving resource configuration efficiency and enhancing data transmission efficiency.

In some embodiments, an identifier of the HARQ process indicated in the indication information, which is sent by the transmitting terminal to the network device, may be consistent with an identifier of the HARQ process of the transmitting terminal of the sidelink, or may be inconsistent with an identifier of the HARQ process of the transmitting terminal of the sidelink. Exemplarily, identifiers of HARQ processes that transmits data packets on the sidelink is 1, 8, 10, while identifiers of HARQ processes indicated in the indication information sent by the transmitting terminal to the network device may be 1, 2, 3.

Exemplarily, the transmitting terminal sends N1 of HARQ process N1 and data packet 1 to a receiving terminal 1 through unlicensed spectrum on the PSSCH. At the same time, the transmitting terminal sends N2 of HARQ process N2 and data packet 2 to a receiving terminal 2. The transmitting terminal generates an indication information by monitoring the PSFCH. The indication information may be configured to indicate data transmission of HARQ process N1 and HARQ process N2.

At block 202, the transmitting terminal sends the indication information to the network device.

In an embodiment of the present disclosure, the indication information is located in the uplink control information UCI.

In an embodiment of the present disclosure, the indication information is located in predetermined bit(s) of the UCI.

In an embodiment of the present disclosure, the indication information is located in a UCI carried by a PUCCH or a PUSCH. Optionally, the indication information is located in predetermined bit(s) of the UCI carried by the PUSCH or the PUCCH.

Exemplarily. taking the indication information indicating a HARQ process as an example, the transmitting terminal indicates data transmission on the HARQ process via predetermined 2 bits of the UCI carried by the PUCCH or the PUSCH. Table 1 provides a table of correspondence between the predetermined bits and the indication content according to embodiments of the present disclosure.

TABLE 1

| Predetermined bits (2 bits) | Indication contents |
| --- | --- |
| 00 | HARQ ACK |
| 01 | HARQ NACK |
| 10 | Un-used |
| 11 | Preserved |

In an embodiment of the present disclosure, when the indication information is configured to indicate data transmission of a HARQ process N, and N is an integer greater than or equal to 0. the indication information is located in a 2N+1st bit and a 2N+2nd bit of the UCI carried by the PUSCH or the PUCCH. The 2N+1st bit and the 2N+2nd bit are configured as predetermined bits indicating the data transmission on the HARQ process N.

As an example, when both the 2N+1 bit and the 2N+2 bit are 0, the indication information is configured to indicate successful data transmission on the HARQ process N; or, when the 2N+1 bit is 0 and the 2N+2 bit is 1, the indication information is configured to indicate data transmission failure on the HARQ process N; or, when the 2N+1 bit is 1 and the 2N+2 bit is 0, the indication information is configured to indicate that the HARQ process N is un-used.

Exemplarily, in the case of the indication information indicating 3 HARQ processes, the transmitting terminal indicates data transmission on the 3 HARQ processes through the predetermined 6 bits of the UCI carried by the PUCCH or the PUSCH. Specifically, bits 3 and 4 indicate data transmission of HARQ process 1 (HARQ process identifier N=1), bits 5 and 6 indicate data transmission of HARQ process 2 (N=2), and bits 7 and 8 indicate data transmission of HARQ process 3 (N=3). For example, the UCI can be expressed as XX000100, where X may take 0 or 1, based on the predetermined bits of the UCI, the network device may determine the successful data transmission on HARQ process 1, the successful data transmission on HARQ process 3, and the data transmission failure on HARQ process 2.

At block 203, the network device determines whether to send the resource configuration information based on the indication information.

The resource configuration information is configured to indicate resource information for data retransmission by the transmitting terminal. The resource configuration information may include an identifier of a HARQ process and time-frequency domain resources which are for performing data retransmission.

In an embodiment of the present disclosure, the indication information sent by the transmitting terminal is configured for indicating successful data transmission on a certain HARQ process, and the network device determines not to send the resource configuration information based on the indication information.

In an embodiment of the present disclosure, the indication information sent by the transmitting terminal is configured for indicating data transmission failure on a certain HARQ process, and the network device dynamically configures a new radio resource for the HARQ process based on the indication information, generates the resource configuration information, and sends the resource configuration information to the transmitting terminal.

According to the information processing method provided in some embodiments of the present disclosure, the transmitting terminal uses unlicensed spectrum to send data to the receiving terminal on the HARQ process. When the transmitting terminal determines that the data needs to be retransmitted, the transmitting terminal may generate indication information and send the indication information to the network device so that the network device is informed of the data transmission on the HARQ process and determines whether new radio resources need to be configured for data retransmission. In the above method, the indication information sent by the transmitting terminal indicates the data transmission on at least one HARQ process, solving a problem that the network device cannot be informed of data transmission on each HARQ process when the transmitting terminal send data using unlicensed spectrum. and thereby improving data transmission efficiency of the communication system.

Figure 5:
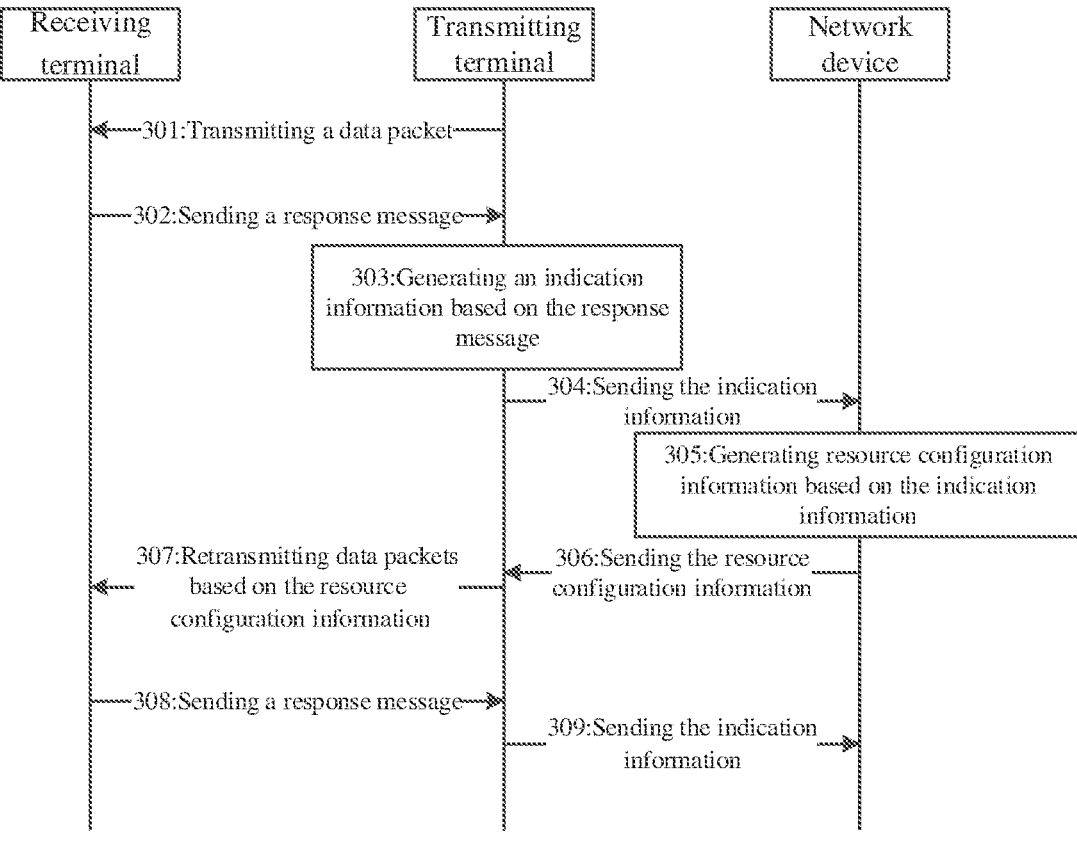
FIG. 5 is an interaction schematic diagram of an information processing method provided in some embodiments of the present disclosure.

FIG. 5 is an interaction schematic diagram of an information processing method provided in some embodiments of the present disclosure. As shown in FIG. 5, the information processing method provided in some embodiments includes actions/operations in the following blocks.

At block 301, a transmitting terminal transmits a data packet to a receiving terminal.

In the embodiment, the transmitting terminal transmits a data packet to the receiving terminal using unlicensed spectrum. Specifically, the transmitting terminal transmits data packets to the receiving terminal on the HARQ process N using the unlicensed spectrum.

At block 302, the receiving terminal sends a response message to the transmitting terminal.

The response message is configured to indicate the data transmission on the HARQ process N. The response message includes a HARQ ACK or a HARQ NACK.

At block 303, the transmitting terminal generates the indication information based on the response message.

At block 304, the transmitting terminal sends the indication information to the network device.

In the embodiment, actions/operations at blocks 303 and 304 are the same as that at blocks 201 and 202 in the embodiment mentioned above, as described in the above embodiment. and will not be repeated here.

At block 305, the network device generates resource configuration information based on the indication information.

For example, if the indication information is configured to indicate the data transmission failure on the HARQ process N, the network device generates resource configuration information according to the indication information, and the resource configuration information is configured to indicate resource information of the transmitting terminal for data retransmission on the HARQ process N. Specifically, the resource configuration information includes the identifier (i.e. N) of the HARQ process N and time-frequency domain resources corresponding to the HARQ process N.

At block 306, the network device sends the resource configuration information to the transmitting terminal.

In an embodiment of the present disclosure, the network device sends the resource configuration information to the transmitting terminal via a PDCCH.

Optionally. the resource configuration information is included in the DCI of the PDCCH.

At block 307, the transmitting terminal retransmits data packets to the receiving terminal based on the resource configuration information.

If the resource configuration information includes resource information for indicating the transmitting terminal to perform data retransmission on the HARQ process N. the transmitting terminal retransmits data packets to the receiving terminal based on the resource configuration information. Specifically. the transmitting terminal retransmits data packets to the receiving terminal via the radio resources reconfigured by the network device.

In some embodiments, if the transmitting terminal performs an initial data transmission on the HARQ process N and the initial data transmission fails, the transmitting terminal performs data retransmission on the original HARQ process N based on the resource configuration information of the network device.

At block 308, the receiving terminal sends a response message to the transmitting terminal.

The response message is configured to indicate the successful or data transmission failure on the HARQ process N, i.e., to indicate data retransmission by the transmitting terminal. including HARQ ACK or HARQ NACK.

At block 309, the transmitting terminal sends an indication information to the network device.

The transmitting terminal generates the indication information based on the response message. If the response message indicates that data retransmission on HARQ process N fails, the indication information is configured to indicate that the data transmission on HARQ process N of the network device fails, and the process may return to that at block 305. If the response message indicates that the data retransmission on HARQ process N succeeds, the indication information is configured to indicate that the data transmission on HARQ process N of the network device succeeds.

In the information processing method provided in some embodiment, when the transmitting terminal transmits data to the receiving terminal on the HARQ process using the unlicensed spectrum. the transmitting terminal may generate an indication information, and the transmitting terminal determines that the data needs to be retransmitted and send the indication information to the network device. The indication information is configured to indicate that data transmission of at least one HARQ process has failed, and the network device generates resource configuration information based on the indication information. The resource configuration information is configured to indicate new resource information of at least one HARQ process for the transmitting terminal, and the transmitting terminal performs data retransmission on at least one HARQ process based on the resource configuration information. In the above method, the indication information sent by the transmitting terminal indicates data transmission failure on at least one HARQ process of the network device, such that the network device performs dynamic resource configuration to realize data retransmission on the HARQ process. This solves the problem that the network device cannot be informed of the data transmission on each HARQ process when the transmitting terminal uses unlicensed spectrum to send data, and improves data transmission efficiency of the communication system.

Optionally, in some embodiments. the transmitting terminal receives HARQ responses sent by the plurality of receiving terminals, and the transmitting terminal generates indication information based on the HARQ responses sent by the plurality of receiving terminals. The indication information is configured to indicate data transmission on the plurality of HARQ processes. The network device generates resource configuration information based on the indication information. The resource configuration information is configured to indicate resource information for data retransmission on the plurality of HARQ processes by the transmitting terminal.

As can be seen from the above description, the resource configuration information may include resource information for one or more HARQ processes to perform data retransmission. Specifically, the resource configuration information may include one or more identifier of HARQ processes performing data retransmission, and the time-frequency domain resources corresponding to the of each HARQ process.

Figure 6:
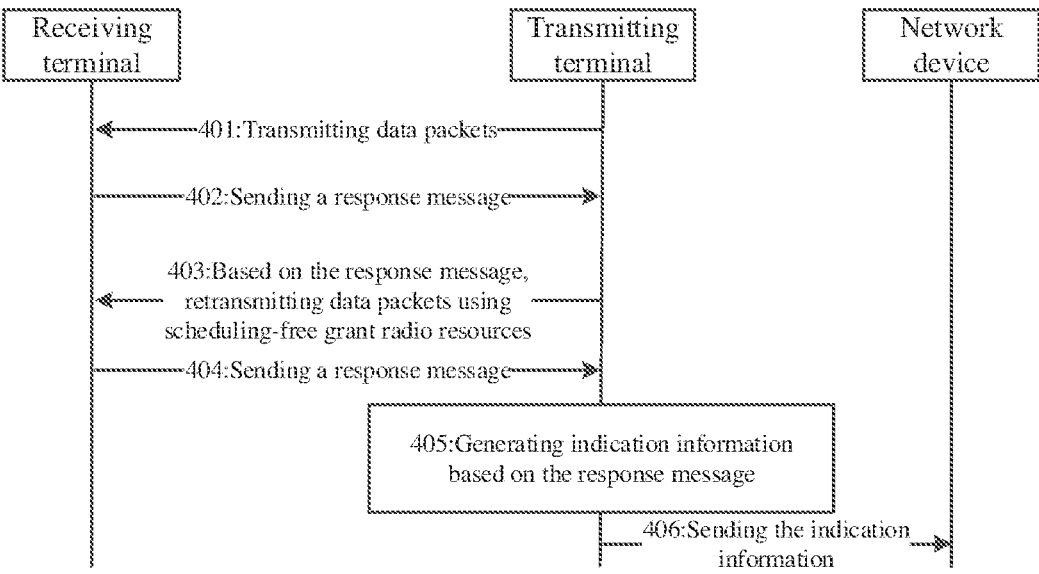
FIG. 6 is an interaction schematic diagram of an information processing method provided in some embodiments of the present disclosure.

FIG. 6 is an interaction schematic diagram of an information processing method provided in some embodiments of the present disclosure, as shown in FIG. 6. the information processing method provided by the present embodiment, including actions/operations in the following blocks.

At block 401, a transmitting terminal transmits a data packet to a receiving terminal.

What at block 401 in the embodiments is the same as that at block 301 of the above embodiment, which can be found in the above embodiment and will not be repeated here.

At block 402, the receiving terminal sends a response message to the transmitting terminal.

In the embodiment, the response message is configured to indicate that data transmission failure on HARQ process N.

At block 403, the transmitting terminal retransmits data packets to the receiving terminal using scheduling-free grant radio resources, based on the response message.

It is noted that the network device pre-configures one or more scheduling-free grants for the transmitting terminal and resource pool configuration information corresponding to each scheduling-free grant. The resource pool configuration information includes 1, 2, or 3 radio resources in one cycle for the scheduling-free grant.

Based on the response message, the transmitting terminal determines that the data transmission on the HARQ process N has failed and may directly employ the scheduling-free grant radio resources pre-configured by the network device to retransmit data on the HARQ process N.

At block 404, the receiving terminal sends a response message to the transmitting terminal.

The response message is configured to indicate the successful or data transmission failure on HARQ process N. i.e., to indicate data retransmission by the transmitting terminal, including HARQ ACK or HARQ NACK.

At block 405, the transmitting terminal generates an indication information based on the response message.

At block 406, the transmitting terminal sends the indication information to the network device.

At this block, the indication information is configured to indicate the successful or data transmission failure on the HARQ process N, i.e., to indicate data retransmission by the transmitting terminal.

In an embodiment of the present disclosure, the transmitting terminal generates the indication information based on the response message. If the response message indicates that data transmission on the HARQ process N has failed, the indication information is configured to indicate that the data transmission on the HARQ process N of the network device fails, and the transmitting terminal may continue to perform data retransmission on the scheduling-free grant radio resource or may request the network device to configure a new radio resource for itself.

In the information processing method provided in the embodiment, the transmitting terminal uses non-licensed spectrum for initial data transmission. If the transmitting terminal determines that data retransmission is required based on the response message from the receiving terminal, unlike that in the embodiment of FIG. 5. the transmitting terminal directly performs data retransmission on the scheduling-free grant radio resource. The above method does not require requesting a new radio resource from the network, which also enables efficient data retransmission and improves data transmission efficiency of the communication system.

Figure 7:
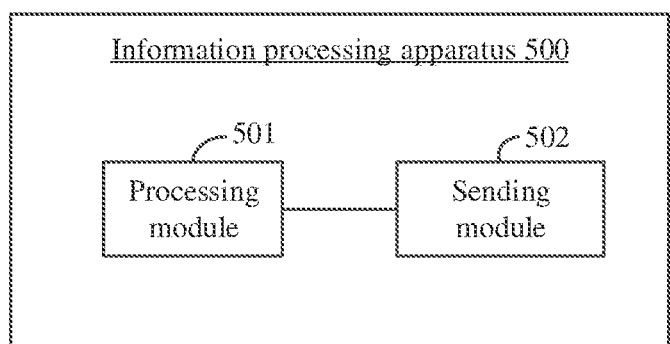
FIG. 7 is a structural schematic view of an information processing apparatus provided in some embodiments of the present disclosure.

FIG. 7 is a structural schematic view of an information processing device provided in some embodiments of the present disclosure. As shown in FIG. 7. the information processing apparatus 500 provided in the embodiment, includes the following.

A processing module 501 for generating an indication information, wherein the indication information is configured to indicate data transmission on at least one HARQ process. and the data transmission at least includes successful data transmission or data transmission failure.

A sending module 502 for sending the indication information to a network device.

In an embodiment of the present disclosure, the indication information is located in UCI.

In an embodiment of the present disclosure, the indication information is located in the UCI carried by a PUCCH or a PUSCH.

In an embodiment of the present disclosure, the indication information is located in predetermined bit(s) of the UCI.

In an embodiment of the present disclosure, in response the indication information is configured to indicate data transmission on a HARQ process N, and N is an integer greater than or equal to 0. the indication information being located in predetermined bits of the UCI, including: the indication information being located in a 2N+1 st bit and a 2N+2nd bit of the UCI.

In an embodiment of the present disclosure, in response to both the 2N+1st bit and the 2N+2nd bit being 0, the indication information is configured to indicate successful data transmission on the HARQ process N.

Alternatively, in response to the 2N+1st bit being 0 and the 2N+2nd bit being 1, the indication information is configured to indicate data transmission failure on the HARQ process N.

Alternatively, in response to the 2N+1st bit being 1 and the 2N+2 bit being 0, the indication information is configured to indicate that the HARQ process N is unused.

In an embodiment of the present disclosure, the processing module 501 is configured for generating the indication information by monitoring a physical sidelink feedback channel (PSFCH).

In an embodiment of the present disclosure, the processing module 501 is configured for:

monitoring, by the transmitting terminal, a response message from the receiving terminal on the PSFCH. wherein the response message is configured to indicate data transmission on the HARQ process N; generating the indication information based on the response message.

In an embodiment of the present disclosure, the processing module 501 is configured for generating the indication information, in response to a response message from a receiving terminal being un-monitored by the transmitting terminal on the PSFCH, wherein the response message being configured to indicate data transmission on HARQ process N, and the indication information is configured to indicate data transmission failure on the HARQ process N.

In an embodiment of the present disclosure, the sending module 502 is further configured for transmitting a data packet to the receiving terminal, before the processing module 501 generates the indication information.

Figure 8:
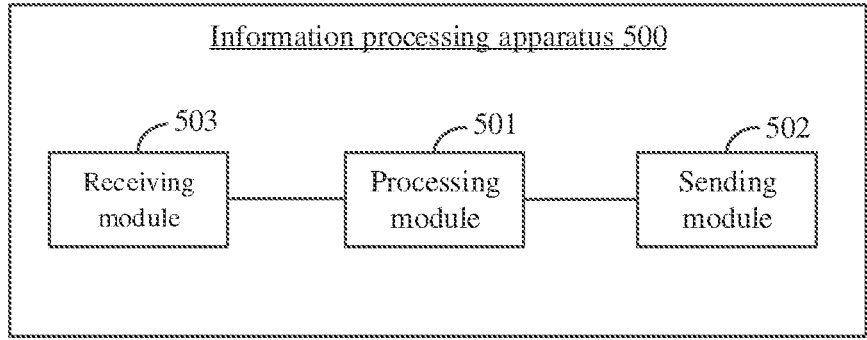
FIG. 8 is a structural schematic view of an information processing apparatus provided in some embodiments of the present disclosure.

FIG. 8 is a structural schematic view of an information processing apparats provided in some embodiments of the present disclosure. Based on the apparatus shown in FIG. 7, as shown in FIG. 8, the information processing apparatus 500 provided in the embodiment, further includes a receiving module 503.

In an embodiment of the present disclosure, when the indication information being configured to indicate data transmission failure on HARQ process N, the receiving module 503 is configured for receiving resource configuration information from the network device; the resource configuration information includes resource information for indicating the transmitting terminal to perform data retransmission on the HARQ process N.

In an embodiment of the present disclosure, the resource configuration information is included in DCI.

In an embodiment of the present disclosure, the resource configuration information at least comprises an identifier of the HARQ process N, and time-frequency domain resources corresponding to the HARQ process N.

In an embodiment of the present disclosure, after the receiving module 503 receives the resource configuration information from the network device, the sending module 502 is configured for retransmitting data packets to the receiving terminal based on the resource configuration information.

The information processing device provided in some embodiments of the present disclosure embodiment for performing the technical solution performed by the transmitting terminal in any of the preceding method in the embodiments is similar in principle of implementation and technical effect, and will not be repeated herein.

Figure 9:
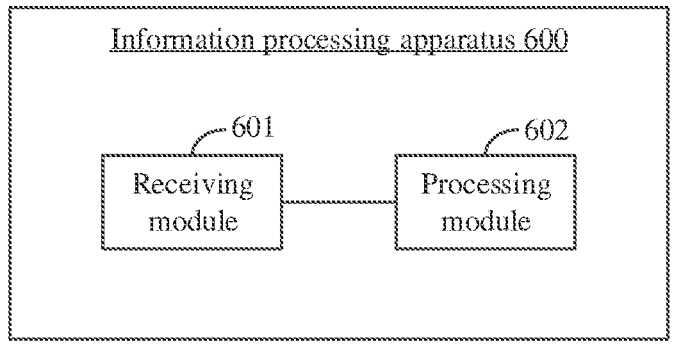
FIG. 9 is a structural schematic view of an information processing apparatus provided in some embodiments of the present disclosure.

FIG. 9 is a structural schematic view of an information processing device provided in some embodiments of the present disclosure. As shown in FIG. 9, the information processing device 600 provided in the embodiment, includes the following.

A receiving module 601 for receiving an indication information from a transmitting terminal, wherein the indication information is configured to indicate data transmission on at least one HARQ process; the data transmission at least includes successful data transmission or data transmission failure.

A processing module 602 for determining whether to send resource configuration information based on the indication information, wherein the resource configuration information is configured to indicate resource information for data retransmission by the transmitting terminal.

In an embodiment of the present disclosure, the indication information is located in UCI.

In an embodiment of the present disclosure, the indication information is located in the UCI carried by a PUCCH or a PUSCH.

In an embodiment of the present disclosure, the indication information is located in predetermined bit(s) of the UCI.

In an embodiment of the present disclosure, in response to the indication information being configured to indicate data transmission for a HARQ process N. and N being an integer greater than or equal to 0, the indication information being located in the predetermined bits of the UCI. includes that the indication information being located in a 2N+1st bit and a 2N+2nd bit of the UCI.

In an embodiment of the present disclosure, in response to both the 2N+1st bit and the 2N+2nd bit being 0, the indication information is configured to indicate successful data transmission on the HARQ process N.

Alternatively, in response to the 2N+1st bit being 0 and the 2N+2nd bit being 1, the indication information is configured to indicate data transmission failure on the HARQ process N.

Alternatively, in response to the 2N+1st bit being 1 and the 2N+2 bit being 0, the indication information is configured to indicate that the HARQ process N is unused.

Figure 10:
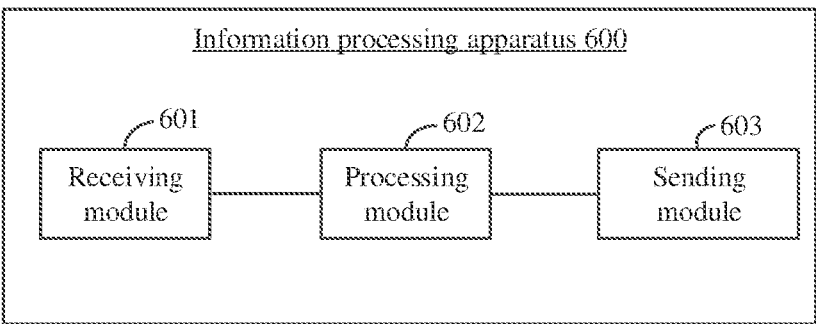
FIG. 10 is a structural schematic view of an information processing apparatus provided in some embodiments of the present disclosure.

FIG. 10 is a structural schematic view of an information processing apparatus provided in some embodiments of the present disclosure. Based on the apparatus as shown in FIG. 9, as shown in FIG. 10, the information processing apparatus 600 of the present embodiment, further includes a sending module 603.

In an embodiment of the present disclosure, the processing module 602 is configured for determining to send the resource configuration information, when the indication information being configured to indicate data transmission failure on the HARQ process N, wherein the resource configuration information comprises resource information for indicating the transmitting terminal to perform data retransmission on the HARQ process N.

The sending module 603 is configured for sending the resource configuration information to the transmitting terminal.

In an embodiment of the present disclosure, the resource configuration information is included in DCI.

In an embodiment of the present disclosure, the resource configuration information at least includes an identifier of the HARQ process N and time-frequency domain resources corresponding to the HARQ process N.

The information processing device provided in some embodiments of the present disclosure for performing the technical solution performed by the network device in any of the preceding method in the embodiments is similar in principle of implementation and technical effect, and will not be repeated herein.

It should be noted that the above division of the various modules of the information processing device is only a logical functional division, and the actual implementation can be fully or partially integrated into a physical entity. or physically separated. These modules may all be implemented in the form of software called through processing components. These modules may also all be implemented in the form of hardware. These modules may also be partially implemented in the form of software called through processing components and partially implemented in the form of hardware. For example, the processing module may be a separately established processing component or may be integrated in one of the chips of the above device for implementation. In addition, the processing module may also be stored in the memory of the above device in the form of program code, which is called by one of the processing components of the above device and performs the functions of the above determined module. Other modules are implemented in a similar way. Furthermore, all or some of these modules may be integrated together or may be implemented independently. The processing component described here may be an integrated circuit with signal processing capabilities. In the implementation. the steps of the method described above or each of the above modules may be accomplished by integrated logic circuits in hardware in the processor component or by instructions in the form of software.

For example, these modules above may be one or more integrated circuits configured to implement the above method, such as one or more disclosure specific integrated circuits (ASIC), or, one or more digital signal processors (DSP), or, one or more field programmable gate arrays (FPGAs), etc. Further, when one of the above modules is implemented in the form of a processing component that dispatches program code, the processing component may be a general processing unit, a central processing unit (CPU) or other processor that may call program code. Alternatively, these modules may be integrated together and implemented as a system-on-a-chip (SOC).

The above embodiments can be achieved in whole or in part by software, hardware, firmware, or any combination thereof. When implemented using software, the implementation may be in whole or in part in the form of a computer program product. The computer program product comprises one or more computer instructions. Loading and executing the computer program instructions on a computer produces, in whole or in part. a process or function as described in the embodiments of the present disclosure. The computer may be a general processing unit, a specialized computer, a computer network, or other programmable device. The computer instructions may be stored in a computer-readable storage medium or transmitted from one computer-readable storage medium to another computer-readable storage medium, e.g., the computer instructions may be transmitted from one site, computer, server, or data center via wired (e.g., coaxial cable, fiber optic, digital subscriber line (DSL)) or wireless (e.g., infrared. wireless. microwave, etc.) means to another website site, computer, server, or data center. The computer-readable storage medium may be any available medium accessible by a computer or a data storage device such as a server, data center, etc. that contains one or more available media integrated. The available media may be magnetic media, (e.g., floppy disk, hard disk, magnetic tape), optical media (e.g., DVD), or semiconductor media (e.g., solid state disk solid state disk (SSD), etc.

Figure 11:
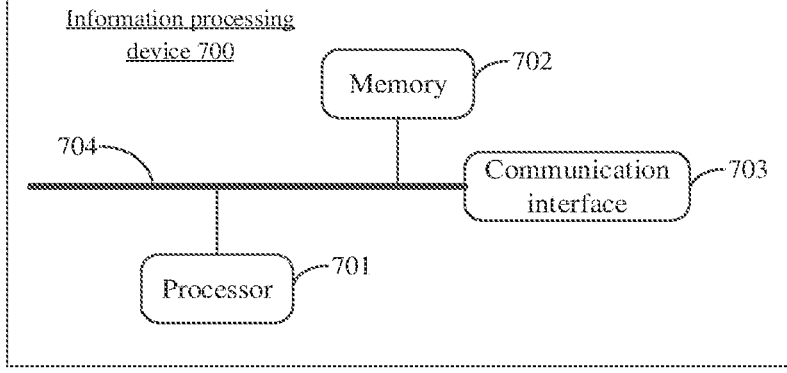
FIG. 11 is a structural schematic view of hardware in an information processing device provided in some embodiments of the present disclosure.

FIG. 11 is a structural schematic view of hardware in an information processing device provided in some embodiments of the present disclosure. As shown in FIG. 11, the information processing device 700 of this embodiment may include: a processor 701, a memory 702, and a communication interface 703. The memory 702 is configured to store a computer program; the processor 701 is configured to execute the computer program stored in the memory 702 to implement the method performed by the transmitting terminal in any of the method in the embodiments described above. A communication interface 703 is used for data communication or signal communication with other devices.

Optionally, the memory 702 may be either independent or integrated with the processor 701. When the memory 702 is a device independent with processor 701, the information processing device 700 may further comprise: a bus 704 for connecting the memory 702 to processor 701.

In a possible implementation, the processing module 501 in FIG. 7 or FIG. 8 may be integrated in the processor 701 and the sending module 502 may be integrated in the communication interface 703. The receiving module 503 in FIG. 8 may be integrated in the communication interface 703 for implementation.

In one possible embodiment, the processor 701 may be configured to implement the signal processing operation of the transmitting terminal in the method in the embodiments described above, and communication interface 703 may be configured to implement the signal sending and receiving operation of the transmitting terminal in the method in the embodiment described above.

The information processing device provided in the embodiment may be configured to implement the method performed by the transmitting terminal in any of the above method in the embodiments, and its implementation principle and technical effect are similar and will not be repeated here.

Figure 12:
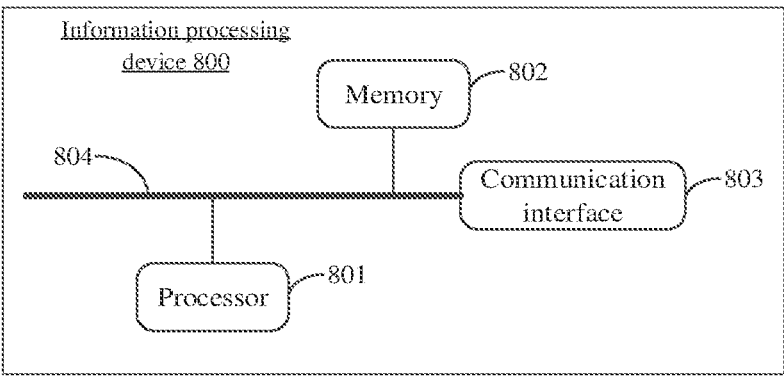
FIG. 12 is a structural schematic view of hardware in an information processing device provided in some embodiments of the present disclosure.

FIG. 12 is a structural schematic view of hardware in an information processing device provided in some embodiments of the present disclosure. As shown in FIG. 12, the information processing device 800 of the embodiment may include: a processor 801, a memory 802, and a communication interface 803. The memory 802 is configured to store a computer program; the processor 801 is configured to execute the computer program stored in the memory 802 to implement the method performed by the network device in any of the above method in the embodiments. Communication interface 803 is used for data communication or signal communication with other devices.

Optionally, the memory 802 may be either independent or integrated with the processor 801. When the memory 802 is a device independent with the processor 801, the information processing device 800 may further comprise: a bus 804 for connecting said memory 802 to the processor 801.

In one possible implementation, the processing module 602 in FIG. 9 or FIG. 10 may be integrated in the processor 801 and the receiving module 601 may be integrated in the communication interface 803. The transmitter module 603 in FIG. 10 may be integrated in the communication interface 803 for implementation.

In one possible embodiment, the processor 801 may be configured to implement the signal processing operation of the network device in the method in the embodiment described above, and the communication interface 803 may be configured to implement the signal sending and receiving operation of the network device in the method in the embodiment described above.

The information processing device provided in the embodiment may be configured to implement the method performed by the network device in any of the above method in the embodiments, and its implementation principle and technical effect are similar and will not be repeated here.

A computer readable storage medium is also provided in some embodiments of the present disclosure. The computer readable storage medium has computer execution instructions stored in it. When the computer execution instructions are executed by the processor, the technical solution of the transmitting terminal are implemented in any of the preceding method in the embodiments.

A computer readable storage medium is also provided in some embodiments of the present disclosure. The computer readable storage medium has computer execution instructions stored in it. When the computer execution instructions are executed by the processor, the technical solution of the network device are implemented in any of the preceding method in the embodiments.

A computer program is also provided in some embodiments of the present disclosure. The computer program for implementing the technical solution of the transmitting terminal in any of the preceding method in the embodiments when the computer program is executed by the processor.

A computer program is also provided in some embodiments of the present disclosure. The computer program for implementing the technical solution of the network device in any of the preceding method in the embodiments when the computer program is executed by the processor.

A computer program product is also provided in some embodiments of the present disclosure. A computer program product includes program instructions. The program instructions are configured to implement the technical solution of the transmitting terminal in any of the preceding method in the embodiments.

A computer program product is also provided in some embodiments of the present disclosure. A computer program product includes program instructions. The program instructions are configured to implement the technical solution of the network device in any of the preceding method in the embodiments.

A chip is also provided in some embodiments of the present disclosure. The chip including: a processing module and a communication interface. The processing module is capable of implementing the technical solution of the transmitting terminal of the preceding method in the embodiments.

Further, the chip further includes a storage module (e.g., memory), the storage module is configured to store instructions. The processing module is configured to execute the instructions stored in the storage module, and execution of the instructions stored in the storage module causes the processing module to execute the technical solution of the transmitting terminal in any of the preceding method in the embodiments.

A chip is also provided in some embodiments of the present disclosure. The chip including: a processing module and a communication interface. The processing module is capable of implementing the technical solution of the network device of the preceding method in the embodiments.

Further, the chip further includes a storage module (e.g., memory), the storage module is configured to store instructions. The processing module is configured to execute the instructions stored in the storage module, and execution of the instructions stored in the storage module causes the processing module to execute the technical solution of the network device in any of the preceding method in the embodiments.

In the disclosure, "at least two" means two or more, and "multiple" means two or more. "And/or" describes the association relationship of the associated objects, indicating there are 3 relationship between objects, for example. A and/or B. which can indicate: the presence of A alone, the presence of both A and B, and the presence of B alone, where A, B can be singular or plural. The character "/" generally indicates that the front and back associated objects are an "or" relationship; in the formula, the character "/", indicates that the front and back associated objects are a "divide" relationship. The expression "at least one (of the following)" or its equivalent refers to any combination of these terms, including any combination of single terms or plural terms. For example, at least one of a, b, or c, may indicate: a, b, c, a-b, a-c, b-c, or a-b-c, wherein a, b, and c may be single or multiple.

It is to be understood that the various numerical numbers involved in the embodiments of the present disclosure are for descriptive convenience of distinction only. and are not intended to limit the scope of the embodiments of the present disclosure.

It is to be understood that in the embodiments of the present disclosure, the size of the serial numbers of the above processes does not imply the order of execution. The order of execution of the processes need be determined by their function and inherent logic, and do not constitute any limitation to the processes implemented in the embodiments of the present disclosure.

What is claimed is:

1. An information processing method, comprising:
   generating, by a transmitting terminal, an indication information, wherein the indication information is configured to indicate data transmission on at least one hybrid automatic retransmission request (HARQ) process, and the data transmission at least comprises successful data transmission or data transmission failure; and sending, by the transmitting terminal, the indication information to a network device,
   wherein the indication information is located in a predetermined bit of uplink control information (UCI),
   wherein when the indication information being configured to indicate data transmission on a HARQ process N and N being an integer greater than or equal to 0, the indication information being located in the predetermined bits of the UCI comprises the indication information being located in a 2N+1st bit and a 2N+2nd bit of the UCI,
   wherein
   in response to both the 2N+1st bit and the 2N+2nd bit being 0, the indication information is configured to indicate successful data transmission on the HARQ process N; or
   in response to the 2N+1st bit being 0 and the 2N+2nd bit being 1, the indication information is configured to indicate data transmission failure on the HARQ process N; or
   in response to the 2N+1st bit being 1 and the 2N+2 bit being 0, the indication information is configured to indicate that the HARQ process N is unused.

2. The method as claimed in claim 1, wherein the indication information is located in the UCI carried by a physical uplink control channel (PUCCH) or a physical uplink shared channel (PUSCH).

3. The method as claimed in claim 1, wherein
   the generating, by the transmitting terminal, the indication information, comprises:
   generating, by the transmitting terminal, the indication information by monitoring a physical sidelink feedback channel (PSFCH).

4. The method as claimed in claim 1, further comprising:
   before the generating the indication information, transmitting, by the transmitting terminal, a data packet to a receiving terminal.

5. The method as claimed in claim 1, wherein when the indication information is configured to indicate data transmission failure on a HARQ process N, the method further comprises:
   receiving, by the transmitting terminal, resource configuration information from the network device, wherein the resource configuration information comprises resource information for indicating the transmitting terminal to perform data retransmission on the HARQ process N.

6. An information processing method, comprising:
   receiving, by a network device, an indication information from a transmitting terminal, wherein the indication information is configured to indicate data transmission on at least one hybrid automatic retransmission request (HARQ) process, and the data transmission at least comprises successful data transmission or data transmission failure; and
   determining, by the network device, whether to send resource configuration information based on the indication information, wherein the resource configuration information is configured to indicate resource information for data retransmission by the transmitting terminal,
   wherein the indication information is located in a predetermined bit of uplink control information (UCI),
   wherein when the indication information being configured to indicate data transmission on a HARQ process N and N being an integer greater than or equal to 0, the indication information being located in the predetermined bits of the UCI comprises the indication information being located in a 2N+1st bit and a 2N+2nd bit of the UCI, wherein in response to both the 2N+1st bit and the 2N+2nd bit being 0, the indication information is configured to indicate successful data transmission on the HARQ process N; or in response to the 2N+1st bit being 0 and the 2N+2nd bit being 1, the indication information is configured to indicate data transmission failure on the HARQ process N; or in response to the 2N+1st bit being 1 and the 2N+2 bit being 0, the indication information is configured to indicate that the HARQ process N is unused.

7. The method as claimed in claim 6, wherein the indication information is located in the UCI carried by a physical uplink control channel (PUCCH) or a physical uplink shared channel (PUSCH).

8. The method as claimed in claim 6, wherein the determining, by the network device, whether to send a resource configuration information based on the indication information, comprises:

in response to the indication information being configured to indicate data transmission failure on a HARQ process N, determining, by the network device, to send the resource configuration information wherein the resource configuration information comprises resource information for indicating the transmitting terminal to perform data retransmission on the HARQ process N; and the method further comprises:

sending, by the network device, the resource configuration information to the transmitting terminal.

9. The method as claimed in claim 8, wherein the resource configuration information is comprised in downlink control information (DCI).

10. The method as claimed in claim 8, wherein the resource configuration information at least comprises an identifier of the HARQ process N, and time-frequency domain resources corresponding to the HARQ process N.

11. A transmitting terminal, comprising a memory and a processor, wherein the memory is configured to store a computer program, and the processor is configured to call and execute the computer program in the memory, causing the transmitting terminal to:

generate an indication information, wherein the indication information is configured to indicate data transmission on at least one hybrid automatic retransmission request (HARQ) process, and the data transmission at least comprises successful data transmission or data transmission failure; and send the indication information to a network device through a communication interface, wherein the indication information is located in a predetermined bit of uplink control information (UCI), wherein when the indication information being configured to indicate data transmission on a HARQ process N and N being an integer greater than or equal to 0, the indication information being located in the predetermined bits of the UCI comprises the indication information being located in a 2N+1st bit and a 2N+2nd bit of the UCI, wherein in response to both the 2N+1st bit and the 2N+2nd bit being 0, the indication information is configured to indicate successful data transmission on the HARQ process N; or in response to the 2N+1st bit being 0 and the 2N+2nd bit being 1, the indication information is configured to indicate data transmission failure on the HARQ process N; or in response to the 2N+1st bit being 1 and the 2N+2 bit being 0, the indication information is configured to indicate that the HARQ process N is unused.

12. The transmitting terminal as claimed in claim 11, wherein the indication information is located in the UCI carried by a physical uplink control channel (PUCCH) or a physical uplink shared channel (PUSCH).

13. The transmitting terminal as claimed in claim 11, wherein the processor is configured to call and execute the computer program in the memory, causing the transmitting terminal to:

generate the indication information by monitoring a physical sidelink feedback channel (PSFCH).

14. The transmitting terminal as claimed in claim 11, wherein the processor is configured to call and execute the computer program in the memory, causing the transmitting terminal to:

transmit a data packet to a receiving terminal before generating the indication information.

15. The transmitting terminal as claimed in claim 11, wherein when the indication information is configured to indicate data transmission failure on a HARQ process N, the processor is configured to call and execute the computer program in the memory, causing the transmitting terminal to:

receive resource configuration information from the network device, wherein the resource configuration information comprises resource information for indicating the transmitting terminal to perform data retransmission on the HARQ process N.

16. The transmitting terminal as claimed in claim 15, wherein the resource configuration information is comprised in downlink control information (DCI).

17. The transmitting terminal as claimed in claim 15, wherein the resource configuration information at least comprises an identifier of the HARQ process N, and time-frequency domain resources corresponding to the HARQ process N.

18. A network device, comprising a communication interface, a memory and a processor, wherein the memory is configured to store a computer program, and the processor is configured to call and execute the computer program in the memory, causing the network device to:

receive an indication information from a transmitting terminal through the communication interface, wherein the indication information is configured to indicate data transmission on at least one hybrid automatic retransmission request (HARQ) process, and the data transmission at least comprises successful data transmission or data transmission failure; and determine whether to send resource configuration information based on the indication information, wherein the resource configuration information is configured to indicate resource information for data retransmission by the transmitting terminal, wherein the indication information is located in a predetermined bit of uplink control information (UCI), wherein when the indication information being configured to indicate data transmission on a HARQ process N and N being an integer greater than or equal to 0, the indication information being located in the predetermined bits of the UCI comprises the indication information being located in a 2N+1st bit and a 2N+2nd bit of the UCI, wherein in response to both the 2N+1st bit and the 2N+2nd bit being 0, the indication information is configured to indicate successful data transmission on the HARQ process N; or in response to the 2N+1st bit being 0 and the 2N+2nd bit being 1, the indication information is configured to indicate data transmission failure on the HARQ process N; or in response to the 2N+1st bit being 1 and the 2N+2 bit being 0, the indication information is configured to indicate that the HARQ process N is unused.

19. The network device as claimed in claim 18, wherein the indication information is located in a UCI carried by a physical uplink control channel (PUCCH) or a physical uplink shared channel (PUSCH).

20. The network device as claimed in claim 18, wherein the processor is configured to call and execute the computer program in the memory, causing the network device to:

determine, in response to the indication information being configured to indicate data transmission failure on a HARQ process N, to send the resource configuration information, wherein the resource configuration information comprises resource information for indicating the transmitting terminal to perform data retransmission on the HARQ process N; and send the resource configuration information to the transmitting terminal.

* * * * *